(12) United States Patent
Bartlett et al.

(10) Patent No.: US 6,434,779 B1
(45) Date of Patent: Aug. 20, 2002

(54) FOOT MAT

(75) Inventors: Gary F. Bartlett, Muncy; Robert D. Kreitz, Williamsport, both of PA (US)

(73) Assignee: Construction Specialties, Inc., Lebanon, NJ (US)

( * ) Notice: Subject to any disclaimer, the term of this patent is extended or adjusted under 35 U.S.C. 154(b) by 16 days.

(21) Appl. No.: 09/610,394

(22) Filed: Jul. 5, 2000

Related U.S. Application Data

(63) Continuation of application No. PCT/US98/27711, filed on Dec. 29, 1998.
(60) Provisional application No. 60/070,725, filed on Jan. 7, 1998.

(51) Int. Cl.⁷ .............................. B32B 3/06; E04F 15/16
(52) U.S. Cl. ............................ 15/215; 15/161; 15/217
(58) Field of Search ..................... 15/160, 215, 216, 15/217, 238, 239, 240, 241; 428/54, 62, 83; 52/177, 181

(56) References Cited

U.S. PATENT DOCUMENTS

| | | | |
|---|---|---|---|
| 4,654,245 A | * | 3/1987 | Balzer et al. |
| 4,877,672 A | * | 10/1989 | Shreiner |
| 5,157,804 A | * | 10/1992 | Williams |
| 5,190,799 A | * | 3/1993 | Ellingson |
| 5,486,392 A | * | 1/1996 | Green |

FOREIGN PATENT DOCUMENTS

| | | | |
|---|---|---|---|
| GB | 2241166 | * | 8/1991 |
| WO | WO 99/34971 | * | 7/1999 |

* cited by examiner

Primary Examiner—Terrence R. Till
(74) Attorney, Agent, or Firm—Baker Botts L.L.P.

(57) ABSTRACT

A foot mat has a plurality of elongated rail members (20) arranged closely adjacent each other with a gap between each adjacent pair of rail members. Each rail member is of uniform cross section along its length and includes a body portion (22) and a pair of spaced-apart dependent leg portions (27). An elongated tread member (100, 104, 106, 108 or 110) is received on the upper surface of each rail member. Each adjacent pair of rail members is joined by an extruded plastic connector member (30) that has a connecting web portion (32) and a pair of generally U-shaped socket portions (38). Each leg portion of each rail and each socket portion of each connecting member are configured to snap-fit together and have interengaging shoulders (27s and 38s) that are configured to retain the leg portion in the socket portion. Each rail member has a pair of laterally spaced-apart dependent elongated anchor tab portions (28), each of the anchor tab portions engaging a socket portion of one of the two connector members to which the rail member is coupled and having been plastically deformed to grip the socket portion so as to prevent longitudinal displacement of the rail member relative to the two connector members.

32 Claims, 5 Drawing Sheets

FOOT MAT

REFERENCE TO PRIOR APPLICATION

The present application is a continuation of pending International (PCT) Application No. PCT/US98/27711, filed Dec. 29, 1998, which in turn is based on U.S. Provisional Patent Application No. 60/070,725, filed Jan. 7, 1998.

TECHNICAL FIELD

The present invention relates to foot mats of the type that are widely used in and near the entryways of commercial, industrial, and institutional buildings to clean the footwear of persons entering the building and minimize the tracking of dirt and moisture into the building and are often used in various work areas.

BACKGROUND ART

One type of foot mat used for building entryways and work areas is composed of elongated, rigid rail members connected in a manner that allows the rails to articulate so that the mat can be rolled up. Examples of such mats, which are similar in concept but have various forms of connections between the rail members, are described and shown in the following United States patents:

U.S. Pat. No. 4,029,834 (Bartlett, 1977)—The rail members include a socket on one side and a flange with an enlarged bead of round cross section on the other side. The socket on each rail receives the bead on an adjacent rail. The bead rotates in the socket to enable adjacent rails to articulate.

U.S. Pat. No. Re. 32,061 (Ellingson, Jr., 1986)—The rail members have sockets on both sides, each of which receives an enlarged bead on a rigid connector of "dogbone" shape in cross section. The concept is essentially the same as that of Bartlett '834, except that the rail members have sockets on both sides and the dogbone connector members are separate from the rail members.

U.S. Pat. No. 4,568,587 (Balzer, 1986)—Sockets in each side of the rail members receive enlarged heads on flexible "I"-shaped connectors, articulation being enabled by flexure of web portions of the connectors.

U.S. Pat. No. 4,654,245 (Balzer et al., 1987)—The design is essentially the same as Balzer '587, except for the addition to the connectors of L-shaped feet, which underlie portions of the rail members and provide non-slip cushions under the mat.

U.S. Pat. No. 5,157,804 (Williams, 1992)—The rail members have beads on each side and are joined by connectors that have sockets that receive the beads. The rails are coextrusions of plastic and have a body of a rigid plastic and layers of soft plastic on the bottoms of supporting feet on the body.

U.S. Pat. No. 5,486,392 (Green, 1996)—The rail members have sockets on each side that open toward the floor and are joined by flexible plastic U-shaped connectors, each of which has an enlarged bead at the upper end of each leg that is received in a socket on the rail member. The connectors rest on the floor and serve as cushions and flex to allow the mat to be rolled up.

An affiliate of the assignee of the present invention, Constructions Specialties (UK) Ltd., markets a foot mat under the trademark PEDILUXE that has rail members with sockets that open along each side and receive enlarged beads on connectors. The sockets of the rail members of the PEDILUXE mats are located below the sides of a web portion. A tread member, such as a carpet strip, extends widthwise almost completely across the top of each rail member, leaving only a narrow flange of the rail member visible on either side of the tread member.

All of the mats referred to above are assembled by sliding the connecting beads lengthwise into the sockets along the entire length of the rail member from one end. The assembly process is laborious and time-consuming and requires a large work area. It is not uncommon for rail members of four meters (12 feet) in length to be assembled using separate connector members, also four meters (12 feet) long. Assembly in that manner also requires a sliding fit between the socket and bead, thus leaving some degree of laxity in all connections. After a desired number of rail members are connected to form the mat, some form of fastener arrangement is required between each rail member and the connector for that rail member to the adjacent rail member, whether the connector be a portion of the adjacent rail member (see Bartlett '834) or a separate connector member (see, e.g., Ellingson, Jr.), to prevent the rail members from sliding longitudinally relative to each other.

Installation of the required fastener arrangement is yet another laborious, tedious and time-consuming operation. When both the socket and bead are of metal, there is a tendency for the mat to rattle due to the sliding fit and metal-to-metal contact. Except for the PEDILUXE mats, all of the mats referred to above have the coupling portions along the sides of the rail members, and the tread members, such as carpet strips, are set in from the side extremities. Thus, a significant portion of the total mat area is taken up by the side connector portions of the rail members. The exposed metal or plastic connector portions of the rail members or of connectors between the rail members are not universally pleasing in appearance to designers and architects.

SUMMARY OF THE INVENTION

One object of the present invention is to provide a foot mat of the type described above that is constructed in a manner that eliminates tedious and time-consuming assembly procedures. Another object is to provide a foot mat that can be readily varied in appearance and function without major modifications of the components or the fixtures and tools used for assembly. Still another object is to improve the appearance of foot mats that use rail members and connectors. It is also desired to retain many of the advantages of previously known designs, such as cushioning elements incorporated into connector members, the absence of metal-to-metal contact between relatively movable parts, the capability of being rolled up, and the capability of accepting different tread surfaces.

The foregoing objects are attained, in accordance with the present invention, by a foot mat that includes a plurality of substantially rigid elongated rail members arranged closely adjacent each other with a gap between each adjacent pair of rail members. Each rail member is of substantially uniform cross section along its length and includes a body portion having side edges, an upper surface and a lower surface and a pair of leg portions projecting generally downwardly from the lower surface of the web portion and spaced apart from each other and from the side edges of the web portion. An elongated tread member is received on the upper surface of the web portion of each rail member. A connector member joins each pair of adjacent rail members to each other, each connector member being an extrusion of at least one polymeric material and being of substantially uniform cross section along its length and including a connecting web portion extending across the gap between the adjacent rail members and a pair of generally U-shaped socket portions. Each socket portion defines a cavity that receives the leg portion of one of the adjacent rail members and is configured to be snap-fitted onto the rail members by pressing the socket portions onto the leg portions of the rail members. Each leg portion and each socket portion have interengaging shoulders configured to retain the leg portion in the socket portion.

The polymeric material of the socket portions should be sufficiently flexible to enable the socket portions to deform and accept the leg portions on the rail members by press-fitting but not so flexible as to permit the leg portions to be readily detached from the leg portions on the rail members. Snap-fitting the connector members onto the adjacent rails has the very important advantage of making assembly much easier to do and requiring significantly less time than sliding them on lengthwise. It is also possible for a complete mat to be partially assembled in sections at a factory and the sections shipped flat to the job site in stacks of a convenient size for handling. The sections can be joined at the job site by installing suitable connectors between the sections.

Providing the leg portions on the rail members and the socket portion on the connectors enhances the stiffness of each rail member and also provides supporting feet for each web portion, the bottom surfaces of the leg portions being located close to the floor on which the mat rests for stable support. The bottom surface of each leg portion can be of a width suitable to avoid high bearing stresses in the bases of the socket portions of the connector members, which is desirable when, as is highly preferred, the connector members are plastic.

An optional, but highly advantageous, feature of the present invention is the inclusion on each rail member of a pair of laterally spaced-apart, dependent elongated anchor tab portions, each of which engages a socket portion of one of the two connector members to which the rail member is coupled. Each of the anchor tab portions is plastically deformed when the mat is assembled and grips the socket portion so as to prevent longitudinal displacement of the rail member relative to the two connector members. The anchor tabs also clamp the socket portions of the connectors to the leg portions of the rails, thus preventing detachment of the leg portions of the rails from the socket portions of the connectors. Each of the anchor tab portions is, preferably, longitudinally coextensive with the body portion of the rail member. It is also desirable for each anchor tab portion to have a plurality of teeth on a contact surface that engages a socket portion of a connector. The teeth may penetrate a surface of the socket portion to attain a good grip. Instead of or in addition to having teeth on the anchor tab portions to enhance the gripping of the connectors to the rails, parts of the leg portions of the rails that are engaged by the socket portions of the connectors may have gripping teeth. Although other fastening arrangements are possible to hold the rail members and connector members against longitudinal displacements relative to each other, the anchor tab portions of the present invention greatly facilitate and speed up assembly, as compared to previously known fastening arrangements.

Each connector member may be an extrusion of a single polymeric material, such as polyvinyl chloride, having enough flexibility to allow snap-fitting of the socket portions onto the leg portions of the rails, permitting the mat to be rolled up, and providing cushioning under the leg portions of the rail members. Each connector may, to advantage, also be a co-extrusion of a relatively soft and flexible polymeric material and a relatively hard and semi-rigid polymeric material, the web portion being of the soft and flexible material and at least a portion of each socket portion being of the hard and semi-rigid material. Use of a hard material for the socket portions makes them more resistant to permitting the leg portions of the rails to pull out. The use of a soft flexible material for the web portion permits the adjacent rail members to articulate by flexure of the web portions, which allows the mat to be rolled up for a thorough cleaning of the floor below it. It is not, however, essential for the web portion to be flexible or for the mat to be capable of being rolled up, inasmuch as a rigid mat can be moved in a flat state from the floor on which it rests for cleaning of the floor. It is desirable, but also not essential, to have a layer of the soft polymeric material under the base of each socket portion to provide a cushion and impart slip resistance.

Each socket portion, in preferred embodiments of the mat of the present invention, has a base portion, an inner flange portion adjacent and joined to the web portion, and an outer flange portion, each of the inner and outer flange portions having a shoulder facing the base portion. Each leg portion of each rail member has an inner shoulder facing and engaging the shoulder on the inner flange portion of the socket and an outer shoulder facing and engaging the shoulder on the outer flange portion of the socket. Snap-fitting of the leg portions of the rail members into the socket portions of the connector members is facilitated by forming the shoulders on the flange portions of each socket as surfaces of protruding beads and providing on each bead a sloping cam surface that diverges from a juncture with the shoulder in a direction away from the base portion of the cavity. Each cam surface is engageable by a surface of the leg portion of the rail member for deformation of the socket portion to accept the leg portion by snap-fitting when the connector member is pressed onto the adjacent rail members upon assembly of the foot mat. Similarly and advantageously, each leg portion of each rail member has sloping cam surfaces converging from junctures with the shoulders on the leg portions in a direction away from the body portion of the rail member, each cam surface being engageable with the flange portions of the socket for deformation of the socket to accept the leg portion by snap-fitting when the connector member is pressed onto the adjacent rail members upon assembly of the foot mat.

It is also desirable for the web portion of the connector member to engage the undersides of parts of the body members of the rail members adjacent the gap between the rail members in order to avoid having any space between the web portion of the connector and the body portions of the rail members where dirt can collect. The web portion of the connector member may have holes to allow water and dirt to pass through to the floor under the mat.

Each rail member should have a side flange portion along each side of the body portion and a lip forming an inwardly facing groove to capture an edge portion of the tread member. As described below, various tread members can be used interchangeably with the same rail members.

As an optional feature for enhancing the good looks of the mat, a decorative cap of, for example, stainless steel or brass can be affixed to each side of the body portion of each rail member. The cap provides an accent strip that sets off each tread member visually. Each cap may have a lip that forms with a portion of the body portion of the rail member an inwardly facing groove that captures an edge portion of a tread member.

For a better understanding of the present invention, reference may be made to the following description of exemplary embodiments, taken in conjunction with the accompanying drawings.

DESCRIPTION OF THE EMBODIMENT

Figure 1:
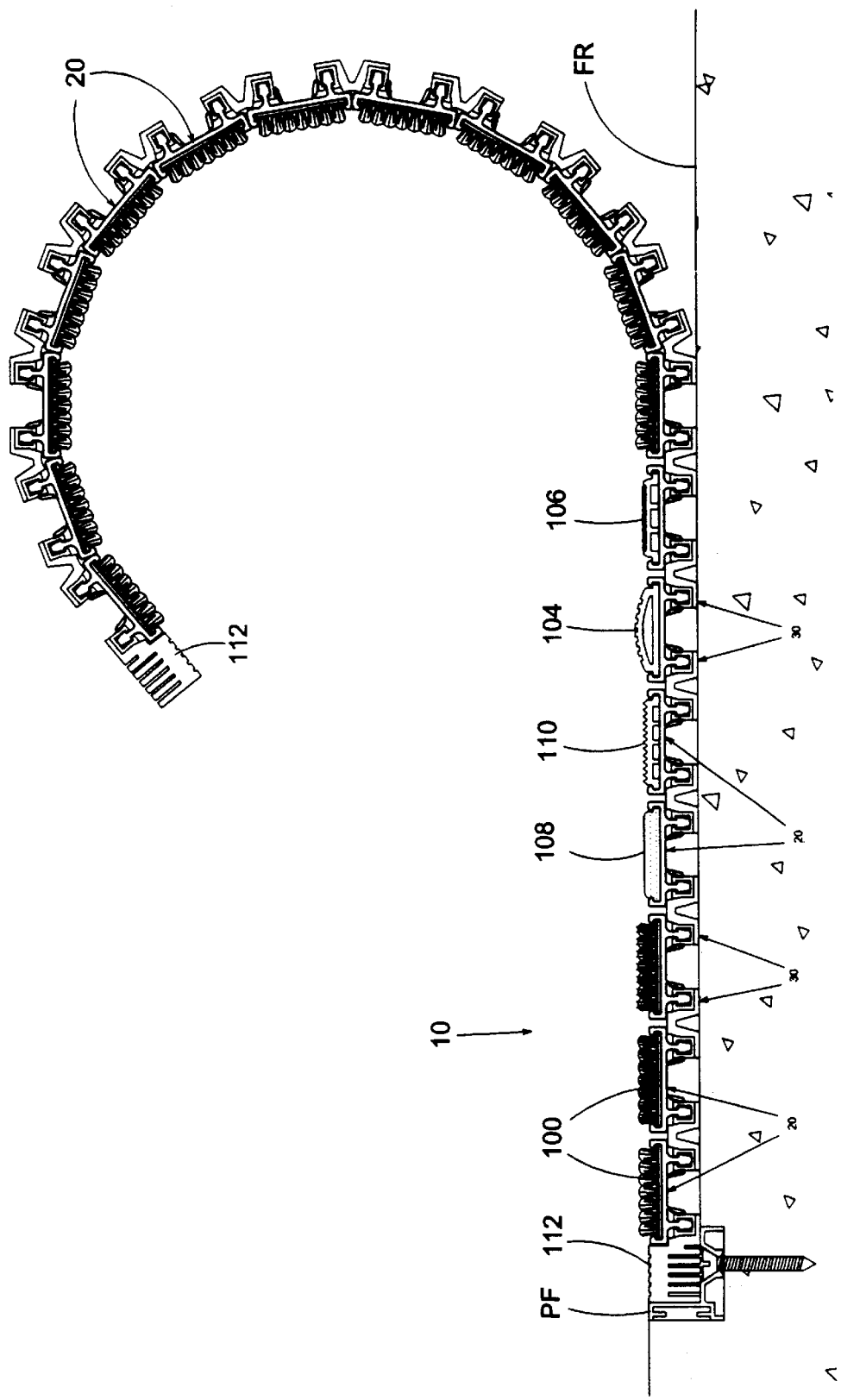
FIG. 1 is an end elevational view of an embodiment of a foot mat according to the present invention, showing it partially rolled up and also showing, solely for purposes of illustration, different tread members on some of the rail members.

In FIG. 1, a foot mat 10 embodying the present invention is installed in a recess FR in a floor that is surrounded by a frame PF. Part of the mat 10 is shown rolled up, thus illustrating a functional feature of the embodiment; obviously, the rolled up part normally rests flat on the floor. Although the most common use for the foot mat of FIG. 1 is at an entranceway to a building, it can also be used in various work areas to provide, for example, a non-slip surface or a surface that will drain liquids readily. The foot mat 10 includes a plurality of identical, substantially rigid, elongated rail members 20, which are arranged closely adjacent each other with a gap between each adjacent pair of rail members. Each rail member 20 is a piece cut to a desired length from an extrusion, usually of aluminum, and is of substantially uniform cross section along its length. Each rail member 20 receives an elongated tread member on the upper surface of the web portion. Various forms of tread members can be used interchangeably on the same rail members. Ordinarily, all of the tread members in a given mat will be the same. Solely for illustration purposes, FIG. 1 shows carpet strips 100, hollow plastic strips 104, plastic strips having an abrasive grit tape bonded to the tread surface 106, poured strips of a grit material dispersed in an epoxy binder 108, and serrated aluminum strips 110. Each pair of adjacent rail members 20 is joined by a connector member 30 of polymeric material, which is described below.

The mat 10 is usually oriented with the rail members extending cross-wise to the usual path of persons walking across it. Vinyl terminal strips 112 are attached to the frontmost and rearmost rail members of the mat 10. The tread members of the foot mat 10, particularly the carpet strips 100, clean dirt and moisture from the footwear of persons entering a building. Much of the dirt and water or slush is scraped into the gaps between the tread surfaces, leaving the tread surface reasonably free of dirt and moisture so that the mat will endure a lot of traffic between cleanings and retain its effectiveness. The mat can be cleaned while in place. Periodically, the mat is picked up, preferably by rolling it up as shown in FIG. 1, to allow the floor FR recess to be cleaned.

Figure 2:
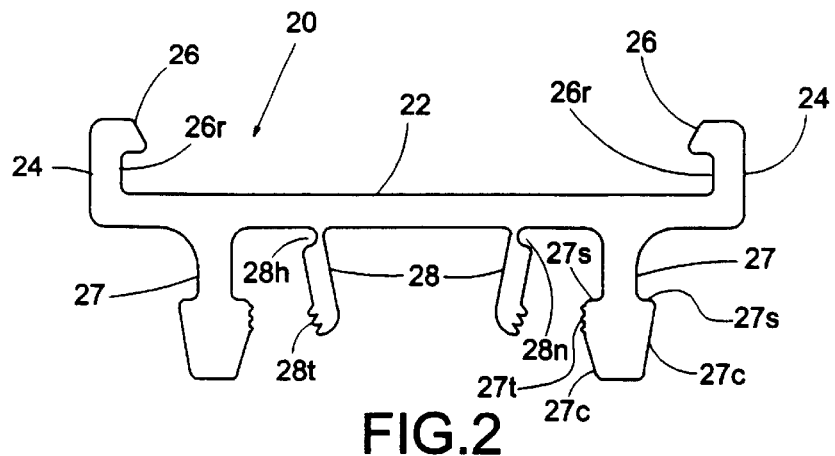
FIG. 2 is an end view of one of the rail members of the mat of FIG. 1.
Figure 4:
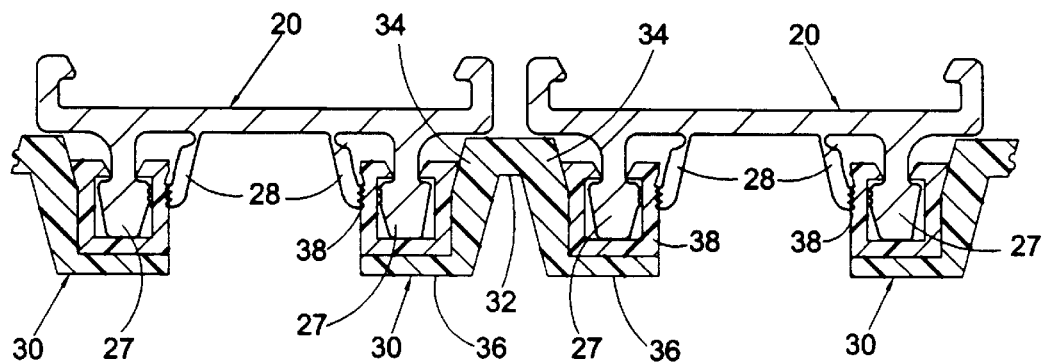
FIG. 4 is a partial end cross-sectional view of a portion of the mat of FIG. 1.

The form of rail member 20 shown in FIGS. 1, 2 and 4 includes a planar web portion 22, a pair of side flanges 24, each of which has a bead 26 at its upper inner end that overlies a small part of the web portion to define a side groove 26r, a pair of dependent leg portions 27, and a pair of dependent anchor tabs 28. The side grooves 26r capture the side edges of the tread members and help retain them in place on the upper surface of the body portion 22. The tread members are secured to the rail members by an adhesive, mechanical fasteners, or punched out tabs (not shown).

Figure 3:
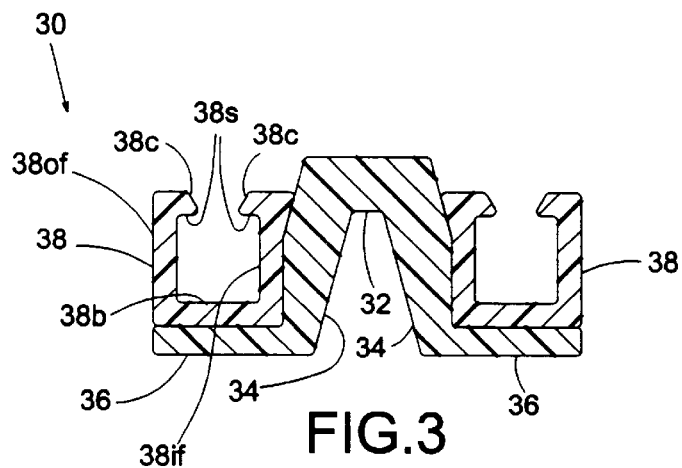
FIG. 3 is an end cross-sectional view of one of the connector members of the mat of FIG. 1.

The connector members 30 (see FIG. 3) are pieces cut to length from coextrusions of a relatively soft and flexible polymeric material and a relatively hard and semi-rigid polymeric material, polyvinyl chloride being preferred. The soft material, which may have a Shore A hardness of 80 durometer, forms a web portion 32, a pair of dependent vertical wall portions 34, and a pair of cushion layers 36. The hard material, which may be of Shore A hardness of 95 durometer, forms a pair of U-shaped socket portions 38. Each of the socket portions has a base wall 38b, inner and outer side flanges 38if and 38of, and a bead at the top of each side flange that has a downwardly facing shoulder 38s and a cam surface 38c that diverges upwardly and outwardly from a juncture with the shoulder. The base, side flanges and shoulders define a cavity, which receives the leg portions 27 of a rail member 20 in the assembled mat.

A mat is assembled from the rail members 20 and the connector members 30 by press-fitting the socket portions 38 of the connector members 30 onto the leg portions 27 of the rail members 20 by forcing the socket portions to accept the lower, enlarged parts of the leg portions 27 into the cavities of the socket portions. For that purpose, it is useful to have a jig to receive and hold in place a large number of rail members top down in proper spacing and to accept connector members with the socket portions in register with the leg portion and to use a long press roller carried on guide tracks to force the connector members into place by moving the press roller along the array of connector members. Acceptance of the leg portions 27 into the cavities of the socket portions 38 is facilitated by a mutual camming action between the cam surfaces 38c on the beads of the socket portions 38 and downwardly and inwardly converging cam surfaces 27c on the leg portions 27. Once in place, the leg portions 27 are retained in the cavities by engagement of upwardly facing shoulders 27s on the leg portions 27 with the shoulders 38s on the flanges 38of of the socket portions 38 (see FIG. 4). The semi-rigid material of the socket portion is sufficiently yieldable to accept the leg portion of the connector member, but is also sufficiently rigid to resist detachment of the rail member from the connector member.

Figure 6:
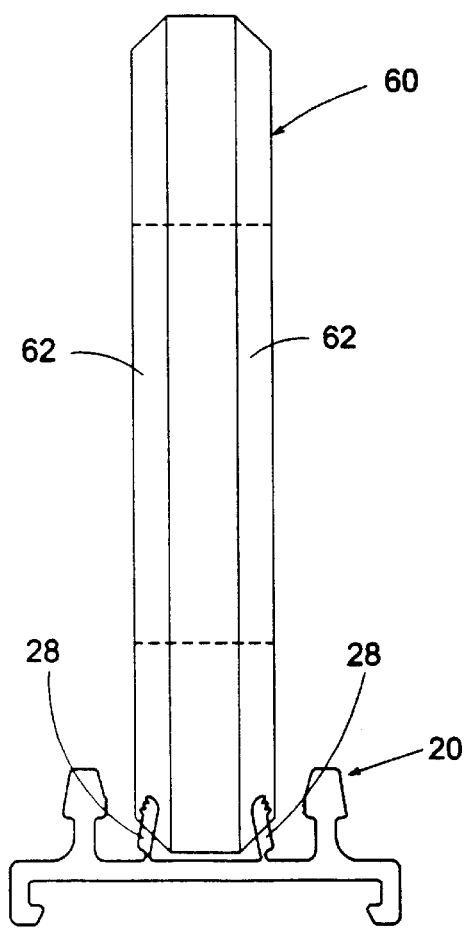
FIG. 6 is a generally schematic drawing of one of a bank of wheels used to deform the anchor tabs of the rail members into engagement with the connector members.
Figure 7A:
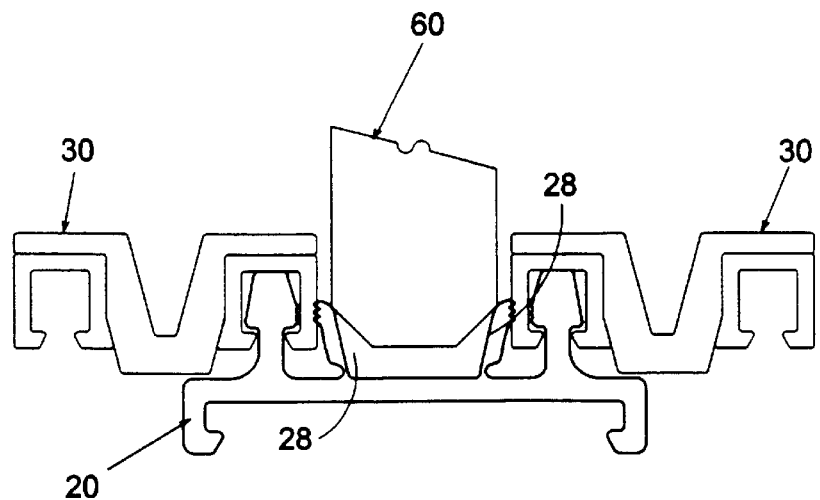
FIGS. 7A and 7B show two stages of the progressive action of the wheel of FIG. 6 in deforming the anchor tabs.
Figure 7B:
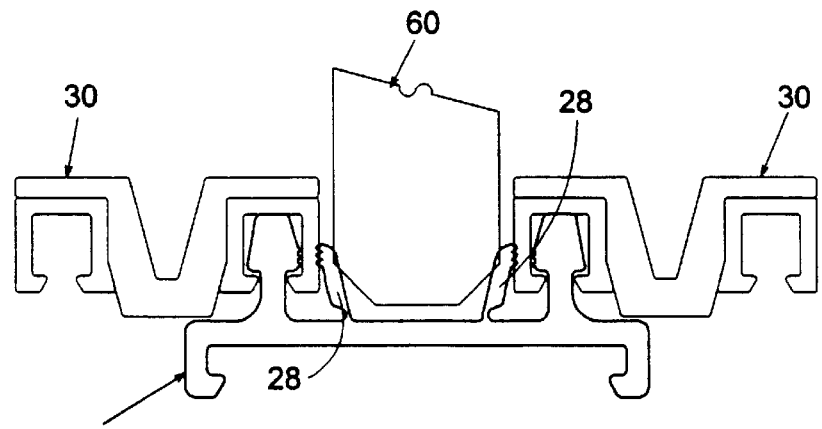
Figure 8:
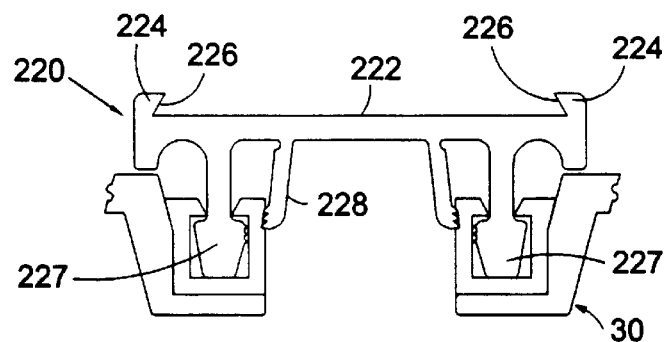
FIG. 8 is an end view of another embodiment of a rail member that can be substituted for the rail members of FIGS. 1, 2, and 4 in a foot mat according to the present invention.

After the rail members and connector members have been assembled on the jig, a second roller tool is moved along the guide tracks to deform the anchor tabs 28 on the rail members laterally out into engagement with the outer flanges 38of of the connector members. (The roller for pressing the connector members in place and the roller tool for deforming the anchor tabs may be parts of a single assembly, in which the press roll leads the roller tool for the anchor tabs.) Referring to FIGS. 6 to 8, the roller tool for deforming the ribs consists of a series of spaced-apart wheels 60, each with beveled edge portions 62 on each side of the perimeter. There is one wheel 60 for each rail of the mat or mat section being assembled. As the wheels 60 traverse the rail members, the beveled portions 62 progressively push the distal ends of the anchor tabs 28 outwardly. A groove 28h (see FIG. 2) at the root of each anchor tab 28 serves as a bending point. Bending begins just after the bevels 62 touch the edges of the anchor tabs (FIG. 7A) at the lead-in end of the array of rail members and connector members being assembled in the jig and progresses until the tips of the anchor tabs are firmly engaged with the outer flanges 38of of the socket portions 38 of the connector members 30. The anchor tabs 28 have teeth 28t, which dig into the outer surfaces of the outer flanges 38of and enhance the strength of the gripping engagements of the connectors 30 by the anchor tabs. The anchor tabs 28 firmly secure each connector member 30 to the two rail members 20 that it joins and prevent the rail members from displacing longitudinally relative to the connector members. The anchor tabs also prevent deformation of the outer flanges 38of of the socket portions 38 relative to the captured leg portions 27 of the rail members and ensure that the leg portions of the rail members do not become dislodged from the cavities of the coupling portions 38. In that regard a part of each outer flange 38of of each socket portion 38 is firmly clamped between an anchor tab 28 and a leg portion 27 of a rail member. Retention may be enhanced by providing teeth 27t on a lateral wall part of each leg portion 27 against which the outer flange 38of of the connector socket 38 is clamped by the anchor tab. The toothed wall part 27t and the toothed part 28t of the anchor tab lie opposite each other and in parallel planes when the mat is assembled.

In an assembled mat (see FIG. 4), the web portion 32 of each connector member 30 extends across the gap between adjacent rail members 20. The soft, flexible material of the web portion bends when the mat is rolled up. The web portion lies very close to, and may if desired engage, the undersides of the edges of the web portions 22 of the rail members, thus excluding dirt from hard-to-clean areas above the inner flanges 38if of the connector members. Dirt is collected on top of the web portion, and water can drain to the ends of the mat along the web portion. If desired, holes can be punched in the web portion to allow dirt and water to fall to the floor between the cushion layers 36. The cushion layers 36 enable the mat to conform to uneven floor surfaces and limit noise by isolating the aluminum rail members from the floor. The leg portions 27 greatly enhance the strength and stiffness of the rail members, which are able to endure very heavy wheel loads.

Figure 5:
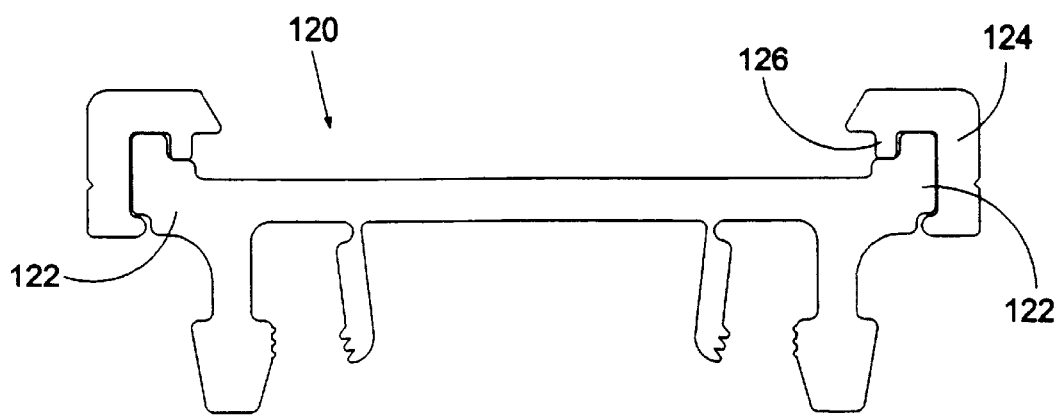
FIG. 5 is an exploded end view of another embodiment of a rail member that can be substituted for the rail members of FIGS. 1, 2, and 4 in a foot mat according to the present invention.

The connector member 30 can be used with modified forms of rail members to form variations of the mat of FIGS. 1, 2 and 4. The rail member 120 of FIG. 5 has flanges 122 along each side that are configured to accept separate top caps 124, which hook onto the flanges 122 and are secured by an epoxy adhesive. The caps 124 are made of a decorative metal, such as brass or stainless steel. The caps are configured to form edge grooves 126 for retention of the tread members. Except for those modifications and a greater overall width, the rail member 120 of FIG. 5 is the same as the rail member 20 shown in FIG. 2.

FIG. 8 shows a rail member 220 that has a shallow recess on the upper surface of the web portion 222 and side flanges 224 forming undercuts 226 for retention of a poured abrasive tread, such as a dispersion of a grit in an epoxy binder (not shown). The leg portions 227 are taller and the anchor tabs 228 longer to compensate for the reduced thickness of the abrasive tread material.

Figure 9:
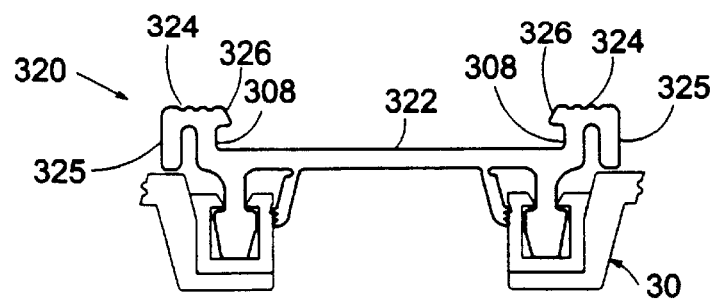
FIG. 9 is an end view of yet another form of a rail member that can be substituted for the rail members of FIGS. 1, 2, and 4 in a foot mat according to the present invention.

The rail member 320 of FIG. 9 has a top flange portion 324 along each side edge of the body portion 322, each top flange portion having a lip 326 forming with an adjacent part of the body portion an inwardly facing groove 308 that captures an edge portion of a tread member. Each top flange portion 324 includes a dependent leg 325, the lower edge of which is closely adjacent the web portion of the connector member to confine dirt to the region above the web portion of the connector.

Figure 10:
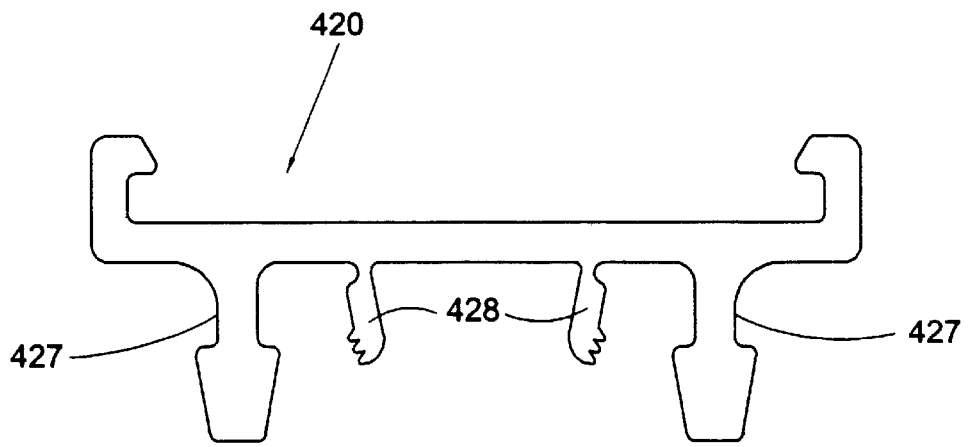
FIG. 10 is an end view of another embodiment of a rail member.

As mentioned above, it is possible to omit the teeth 27t (see FIG. 2) on the inner sides of the leg portions 27 of the rail members. FIG. 10 shows a form of rail member 420 that is the same as that of FIGS. 1, 2 and 4 but has leg portions 427 that have no teeth. Other variations of the rail members include embodiments having leg portions with teeth and anchor tabs without teeth and embodiments in which neither the leg portions nor the anchor tabs have teeth.

Figure 11:
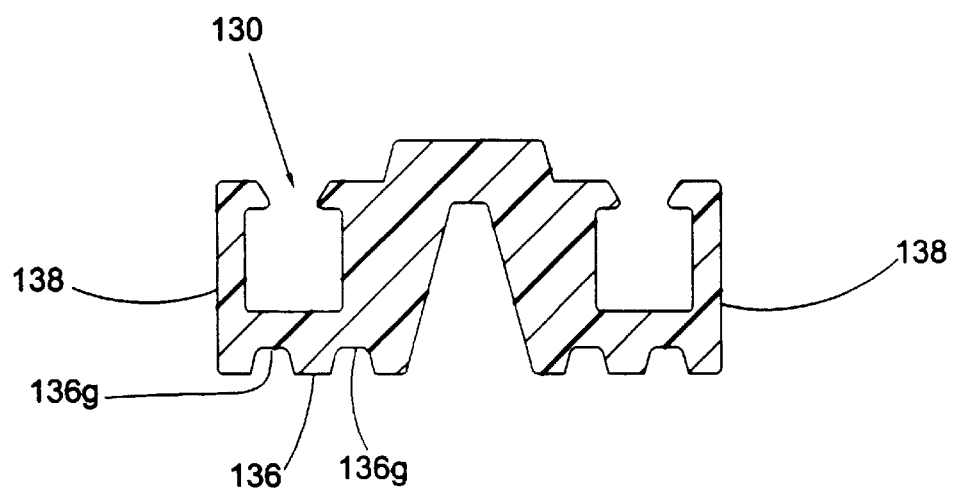
FIG. 11 is an end cross-sectional view of another embodiment of a connector member.

FIG. 11 illustrates a connector member 130 that is an extrusion of a single polymeric material (rather than a coextrusion of polymers of different hardnesses). The hardness of the polymer is chosen such that the socket portions 138 are deformable so as to accept the leg portions of the rail members. The bases 136 of the socket portions have grooves 136g for enhancing the grip of the connector members with a floor surface, the polymeric material being harder and thus having a lower coefficient of friction than a softer polymeric material useful in a coextruded connector member. Other variations of the connector member include versions in which only the bases of the socket portions are of a softer polymeric material and the socket portions and web portions are of a harder polymeric material. The web portion of a connector of the form of FIG. 11 has reduced bendability, as compared to the connector of FIG. 3, but it is not essential for a mat of the type of the present invention to be capable of being rolled up.

What is claimed is:

1. A foot mat comprising a plurality of substantially rigid elongated rail members arranged closely adjacent each other with a gap between each adjacent pair of rail members, each rail member being of substantially uniform cross section along its length and including a body portion having side edges, an upper surface and a lower surface, an elongated tread member received on an upper surface of a web portion of each rail member, and a connector member joining each pair of adjacent rail members to each other, each connector member being an extrusion of at least one polymeric material and being of substantially uniform cross section along its length and including a connecting web portion extending across the gap between the adjacent rail members, wherein each rail member has a pair of leg portions projecting generally downwardly from the lower surface of the web portion and spaced apart from each other and from the side edges of the web portion, each connector member has a pair of generally U-shaped socket portions, each socket portion defining a cavity that receives the leg portion of one of the adjacent rail members and being configured to be snap-fitted onto the rail members by pressing the socket portions onto the leg portions of the rail members, and each leg portion and each socket portion have interengaging shoulders configured to retain the leg portion in the socket portion.

2. A foot mat according to claim 1 wherein each rail member has a pair of laterally spaced-apart dependent elongated anchor tab portions, and wherein each of the anchor tab portions engages a socket portion of one of the two connector members to which the rail member is coupled, each anchor tab portion having been plastically deformed to grip the socket portion and prevent longitudinal displacement of the rail member relative to the two connector members.

3. A foot mat according to claim 2 wherein each of the anchor tab portions is longitudinally coextensive with the body portion of the rail member.

4. A foot mat according to claim 3 wherein each anchor tab portion has a plurality of teeth on a contact surface that engages a socket portion.

5. A foot mat according to claim 4 wherein the teeth penetrate a surface of the socket portion.

6. A foot mat according to claim 1 wherein each connector member is a co-extrusion of a relatively soft and flexible polymeric material and a relatively hard and semi-rigid polymeric material, the web portion being of the soft and flexible material and at least a portion of each socket portion being of the hard and semi-rigid material.

7. A foot mat according to claim 6 wherein each socket portion has a base portion and a pair of side flange portions and in that both side flange portions and a layer of the base portion that forms a base wall of the cavity is of the hard and semi-rigid material and a bottom surface layer of the base portion that is adapted to rest on a floor is of the soft and flexible material.

8. A foot mat according to claim 1 wherein each U-shaped socket portion has a base portion, an inner flange portion adjacent and joined to the web portion, and an outer flange portion, each of the inner and outer flange portions having a shoulder facing the base portion.

9. A foot mat according to claim 8 wherein each rail member has a pair of laterally spaced-apart dependent elongated anchor tab portions, and wherein each of the anchor tab portions engages an outer surface of the outer flange portion of a socket portion of one of the two connector members to which the rail member is coupled, each anchor tab portion having been plastically deformed to engage the outer flange portion of one of the two connector members and prevent longitudinal displacement of the rail member relative to the two connector members.

10. A foot mat according to claim 9 wherein each of the anchor tab portions is longitudinally coextensive with the body portion of the rail member.

11. A foot mat according to claim 10 wherein each anchor tab portion has a plurality of teeth on a contact surface that engages the outer flange portion.

12. A foot mat according to claim 11 wherein the teeth penetrate a surface of the outer flange portion.

13. A foot mat according to claim 9 wherein a laterally facing surface of each leg portion of each rail member is held in clamping engagement with an inner surface of the outer flange portion of a socket portion of a connector member by a clamping lug of a rail member and in that each laterally facing surface has elongated teeth.

14. A foot mat according to claim 13 wherein the clamped portion of each outer flange portion is spaced apart from the base portion of the socket portion.

15. A foot mat according to claim 8 wherein each leg portion of each rail member has an inner shoulder facing and engaging the shoulder on the inner flange portion of the socket and an outer shoulder facing and engaging the shoulder on the outer flange portion of the socket.

16. A foot mat according to claim 8 wherein each socket portion is of a semi-rigid elastically deformable polymeric material, the shoulders on the flange portions of each socket are surfaces of protruding beads, and each bead has a sloping cam surface that diverges from a juncture with the shoulder in a direction away from the base portion of the cavity, each cam surface being engageable by a surface of the leg portion of the rail member for deformation of the socket portion to accept the leg portion by snap-fitting when the connector member is pressed onto the adjacent rail members upon assembly of the foot mat.

17. A foot mat according to claim 8 wherein each socket portion is of a semi-rigid elastically deformable polymeric material, each leg portion of each rail member has sloping cam surfaces converging in a direction away from the body portion of the rail member, each cam surface being engageable with the flange portions of the socket for deformation of the socket to accept the leg portion by a snap-fitting when the connector member is pressed onto the adjacent rail members upon assembly of the foot mat.

18. A foot mat according to claim 8 wherein each socket portion is of a semi-rigid elastically deformable polymeric material, the shoulders on the flange portions of each socket portion are surfaces of protruding beads, each bead has a sloping cam surface that diverges from a juncture with the shoulder in a direction away from the base portion of the cavity portion, and each leg portion of each rail member has a sloping cam surface converging in a direction away from the body portion of the rail member, the cam surfaces on the beads being engageable by the cam surfaces on the leg portions for deformation of the socket to accept the leg portion by a snap-fitting when the connector member is pressed onto the adjacent rail members upon assembly of the foot mat.

19. A foot mat according to claim 1 wherein the web portion of the connector member is closely adjacent the undersides of parts of the rail members adjacent the gap between the rail members so as to restrict dirt from passing between the web portion and the rail members.

20. A foot mat according to claim 1 wherein each rail member has a side flange portion along each side of the body portion, and each side flange portion has a lip forming an inwardly facing groove that captures an edge portion of the tread member.

21. A foot mat according to claim 1 and further comprising a top cap affixed to each side of the body portion of each rail member.

22. A foot mat according to claim 1 and further comprising a top cap affixed to each side of the body portion of each rail member, each top cap having a lip forming with a portion of the body portion of the rail member an inwardly facing groove that captures an edge portion of the tread member.

23. A foot mat according to claim 1 wherein each rail member has a top flange portion along each side edge of the body portion, the top flange portion having a lip forming with an adjacent part of the body portion an inwardly facing groove that captures an edge portion of the tread member.

24. A foot mat according to claim 1 wherein each top flange portion includes a dependent leg having a lower edge closely adjacent the web portion of the connector member.

25. A foot mat according to claim 1 wherein each U-shaped socket portion has a base portion, an inner flange portion adjacent and joined to the web portion, and an outer flange portion, each of the inner and outer flange portions having a shoulder facing the base portion, each rail member has a pair of laterally spaced apart dependent elongated anchor tab portions, each of the anchor tab portions engaging the outer flange portion of one of the two connector members to which the rail member is coupled, each anchor tab portion having been plastically deformed to clamp a part of one outer flange portion of the connector against a part of one leg portion of the rail member so as to prevent longitudinal displacement of the rail member relative to the connector member and restrict detachment of the connector member from the rail member.

26. A foot mat according to claim 25 wherein each of the anchor tab portions is longitudinally coextensive with the body portion of the rail member.

27. A foot mat according to claim 25 wherein each anchor tab portion has elongated teeth on a contact surface that engages the outer flange portion in clamping relation to the leg portion of the rail.

28. A foot mat according to claim 25 wherein a part of each leg portion against which an outer flange portion is clamped has elongated teeth.

29. A foot mat according to claim 25 wherein the shoulders on the flange portions of each socket are surfaces of protruding beads, and each bead has a sloping cam surface that diverges from a juncture with the shoulder in a direction away from the base portion of the cavity, each cam surface being engageable by a surface of the leg portion of the rail member for deformation of the socket portion to accept the leg portion by snap-fitting when the connector member is pressed onto the adjacent rail members upon assembly of the foot mat.

30. A foot mat according to claim 25 wherein each leg portion of the rail member has sloping cam surfaces converging in a direction away from the body portion of the rail member, each cam surface being engageable with the flange portions of the socket for deformation of the socket to accept the leg portion by a snap-fitting when the connector member is pressed onto the adjacent rail members upon assembly of the foot mat.

31. A foot mat according to claim 25 wherein the shoulders on the flange portions of each socket portion are surfaces of protruding beads, each bead has a sloping cam surface that diverges from a juncture with the shoulder in a direction away from the base portion of the cavity portion, and each leg portion of each rail member has a sloping cam surface converging in a direction away from the body portion of the rail member, the cam surfaces on the beads being engageable by the cam surfaces on the leg portions for deformation of the socket to accept the leg portion by a snap-fitting when the connector member is pressed onto the adjacent rail members upon assembly of the foot mat.

32. A foot mat according to claim 31 wherein the part of the outer flange portion of each connector member that is clamped by an anchor tab portion of a rail is adjacent the protruding bead and remote from the base portion of the U-shaped portion.

\* \* \* \* \*